United States Patent
Rocksvold

(10) Patent No.: US 11,440,053 B1
(45) Date of Patent: Sep. 13, 2022

(54) PARTICULATE REMOVAL DEVICE

(71) Applicant: Nick Rocksvold, Santa Paula, CA (US)

(72) Inventor: Nick Rocksvold, Santa Paula, CA (US)

(*) Notice: Subject to any disclaimer, the term of this patent is extended or adjusted under 35 U.S.C. 154(b) by 366 days.

(21) Appl. No.: 16/877,588

(22) Filed: May 19, 2020

Related U.S. Application Data

(60) Provisional application No. 62/904,776, filed on Sep. 24, 2019.

(51) Int. Cl.
*B65G 15/14* (2006.01)
*B65G 15/62* (2006.01)
*B07B 4/08* (2006.01)
*B07B 11/06* (2006.01)

(52) U.S. Cl.
CPC ........... *B07B 4/08* (2013.01); *B07B 11/06* (2013.01); *B65G 15/14* (2013.01); *B65G 15/62* (2013.01); *B65G 2812/02089* (2013.01)

(58) Field of Classification Search
None
See application file for complete search history.

(56) References Cited

U.S. PATENT DOCUMENTS

| | | | | |
|---|---|---|---|---|
| 1,049,614 A | * | 1/1913 | Sigler | B30B 5/062 100/154 |
| 1,659,733 A | * | 2/1928 | Harbeck | B30B 9/245 100/106 |
| 3,106,152 A | * | 10/1963 | Coffelt | B30B 9/24 100/118 |
| 7,387,197 B2 | * | 6/2008 | Sprouse | F04D 33/00 198/626.1 |
| 8,739,962 B2 | * | 6/2014 | Bielenberg | B01J 8/003 198/604 |

* cited by examiner

*Primary Examiner* — Kavel Singh
(74) *Attorney, Agent, or Firm* — Sandy Lipkin

(57) ABSTRACT

A device for removing particulates from plant matter that includes a shelf through which the product is introduced into the device where the plant matter is moved through toward an output wherein the machine includes a lower conveyor belt, an upper conveyor belt, drive assemblies for both conveyor belts with adjustable speed wherein each conveyor belt is supported by a shelf and wherein the upper portion of each conveyor belt is moving in the direction opposing the other one resulting in the conveyor belt portions in contact with the product traveling in the same direction. An air source is provided that forces air through product as it travels between both conveyor belts through a fixed lower conduit and an upper conduit that is movable in an upward direction through a pivoting mount across the top conveyor belt that allows for displacement of the conduit from the lower conveyor belt as the product moves through the device.

2 Claims, 3 Drawing Sheets

PARTICULATE REMOVAL DEVICE

REFERENCE TO PRIOR APPLICATION

This application claims priority of the provisional patent application 62/904,776, filed Sep. 24, 2019 entitled DUAL CONVEYOR BELT PRODUCE CLEANER by Nick Rocksvold.

BACKGROUND OF THE INVENTION

Field of the Invention

The present invention relates generally to the field of removing desirable or unwanted particles, residue and/or insects from plant matter during the harvesting or post-harvest processing.

Description of the Prior Art

During the growing process unwanted particles may be deposited on plant surfaces by contaminated air flow over the plants. Insects may also come into contact with the plant and remain there and/or deposit undesirable residues. Some plants produce desirable residues that need to be removed from the undesirable portions of the plant. Unwanted residue from contaminated air flow can be eliminated by growing plants in structures where outside air flow can be eliminated or filtered. In some applications insect infestation can be controlled in a similar manner.

Some prior art devices remove undesirable substances from the plant using forced air flow over with debris collection while the plant is still growing or during the harvesting process. Other prior devices collect desirable substances by using temperature manipulation, agitation and filtering to separate desirable from undesirable portions of the plants' substances.

There are shortcomings with these approaches, however. The forced air flow process is limited to treating the entire plant, intact. It focuses on removing debris from the outer areas and may not be as effective on inner areas. The air flow source is often well away from the plant surface which can also reduce its effectiveness. The agitation process relies in gravity to separate desirable particles from the plant which result in a lower percentage of removal It is the object of the instant invention to provide a more efficient method for removing particles or insects from plants.

It is a further object of the instant invention to provide adjustable air flow sources in conjunction with an adjustable speed at which the plants travel through the air flow to enable the invention to be adjusted to the most effective rates for each different application.

It is a further object of the instant invention to provide a feed mechanism that automatically adjusts for different plant sizes and has the ability to keep the air flow sources at a constant distance from the plant surfaces

SUMMARY OF THE INVENTION

The preferred embodiment of the present invention teaches a feeding conveyor, air flow sources and a collection area for removed materials: a lower porous conveyor belt riding on a horizontal shelf that has an opening through which air flow can be directed towards or away from the plant being fed past the air flow source; an upper porous conveyor belt mounter directly above the lower conveyor belt that is driven such that the lower side of the upper belt travels in the same direction as the top side on the lower belt; The upper conveyor belt will have excess belt length such that the bottom portion through the force of gravity will ride directly on top of the lower conveyor belt; a second air flow source mounted between the upper and lower portions of the upper feed belt that has a pivoting mount that by the force of gravity allows it to maintain a constant distance between the inner surface of the upper belt's lower side; features that direct material removed from the plants into a collection area.

The above embodiment can be further modified by defining that the excess upper belt length allows it's lower surface to move away from the upper surface of the lower belt as different sizes of plant matter is fed between them.

As claimed, the instant invention discloses a device for feeding plant matter for removing particulate matter therefrom comprising: a lower porous conveyor belt with an air source that can direct air flow past the bottom of plant matter being fed over the top of said lower porous conveyor belt; an upper porous conveyor belt with an air source that can direct air flow past the top of said plant matter being fed beneath the bottom horizontal portion of said upper porous conveyor belt.

The above embodiment can be further modified by defining that said lower and upper porous conveyor belts are sprocket driven connected by a 1 to 1 ratio chain drive that causes both of said conveyor belts to travel at the same linear speed.

The above embodiment can be further modified by defining that said air source is supporting by a pivoting mount assembly that allows the end of said pivoting mount closest to said plant matter to maintain a constant distance from said plant matter.

BRIEF DESCRIPTION OF THE DRAWINGS

For a better understanding of the present invention, reference is to be made to the accompanying drawings. It is to be understood that the present invention is not' limited to the precise arrangement shown in the drawings.

DETAILED DESCRIPTION OF A PREFERRED EMBODIMENT

Figure 1:
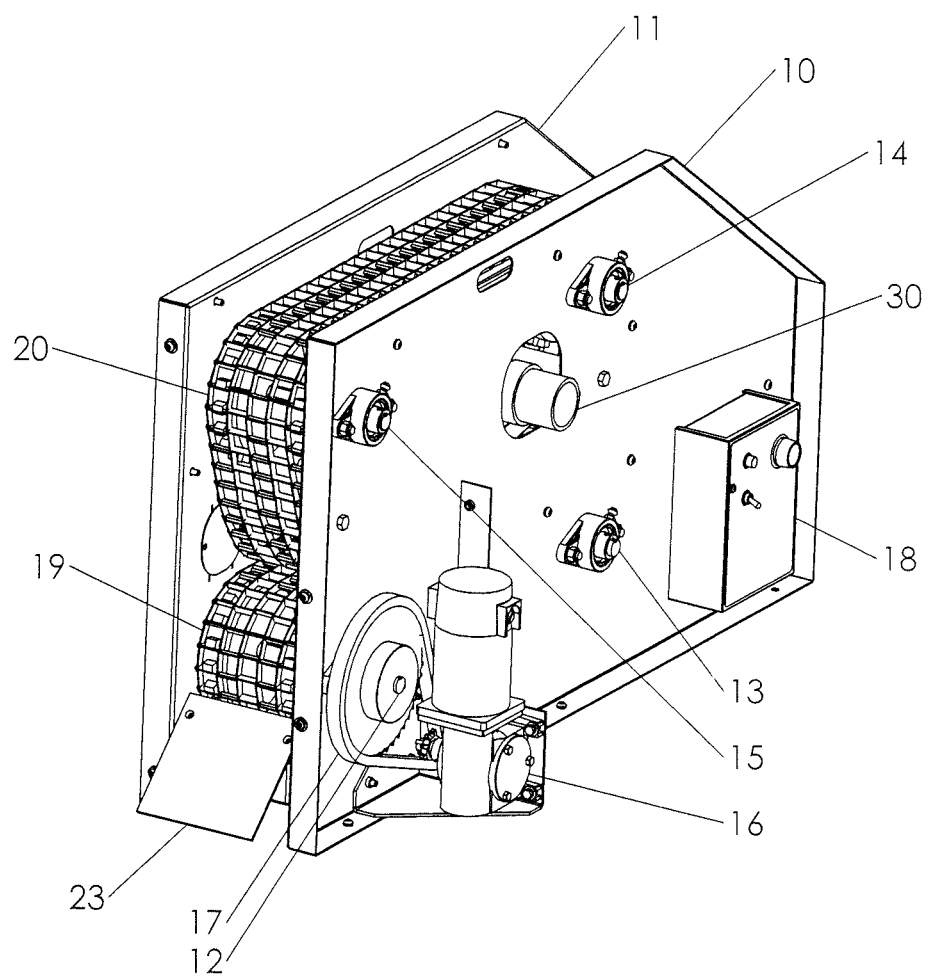
FIG. 1 is a left side perspective view of the feed conveyor device of the instant invention.

Turning to the drawings, the preferred embodiment is illustrated and described by reference characters that denote similar elements throughout the several views of the instant invention.

Figure 2:
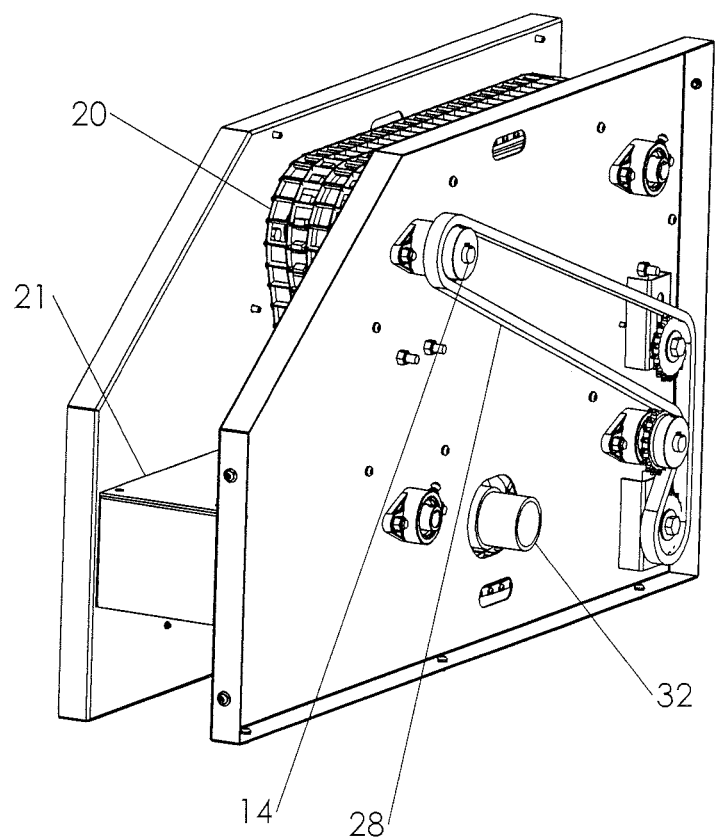
FIG. 2 is a right side perspective view of the feed conveyor device of the instant invention.
Figure 3:
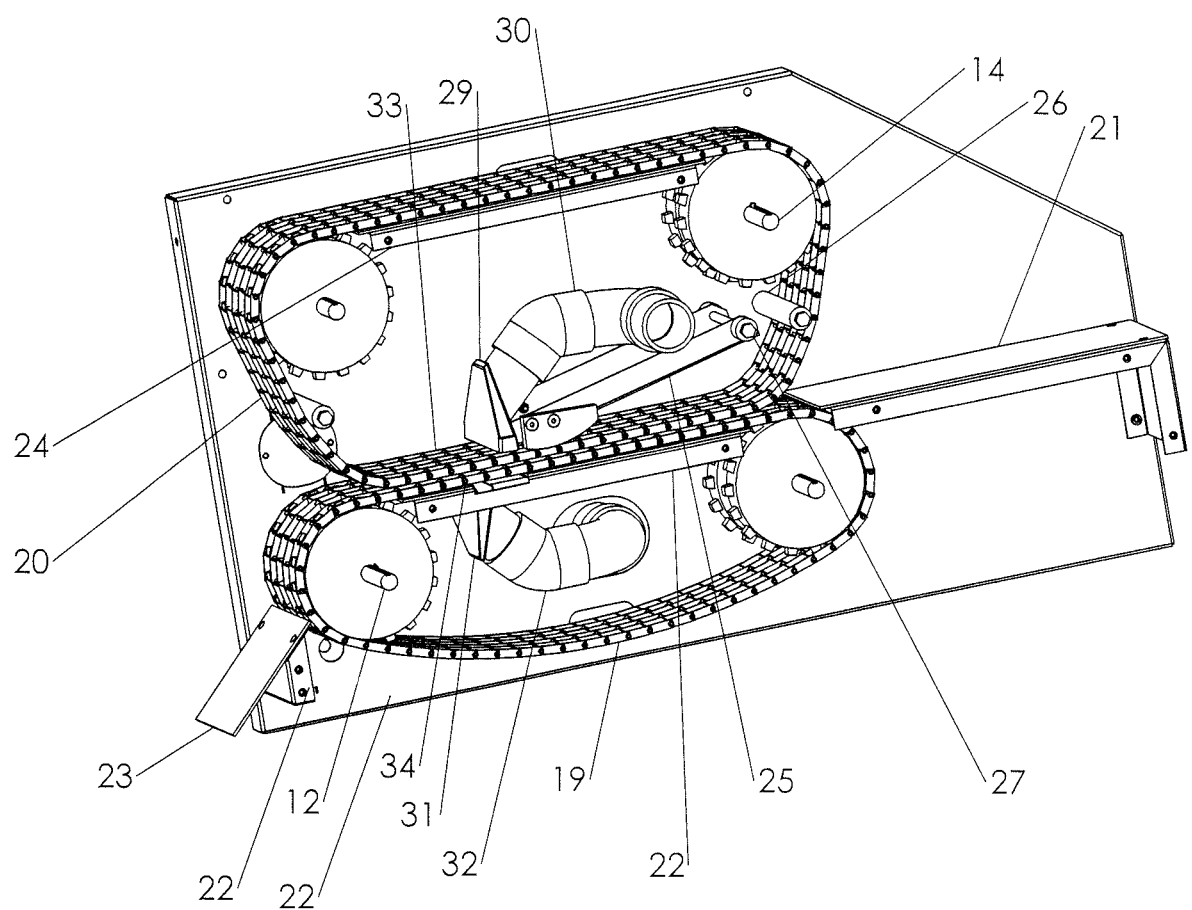
FIG. 3 is left side perspective view of the feed conveyor device of the instant invention that has the left side frame and drive components removed to reveal the internal components.

The preferred embodiments of the instant invention are illustrated in detail in FIGS. 1-3. The preferred embodiment of the instant invention provides for a device that includes first and second frames 10 and 11 that provides support for lower conveyor belt drive shaft assembly 12, lower conveyor belt driven shaft assembly 13, upper conveyor drive shaft assembly 14, upper conveyor belt driven shaft assembly 15, conveyor drive motor 16, conveyor drive chain assembly 17, speed control 18, lower belt 19, upper belt 20, product infeed table 21, lower belt support table 22, lower belt discharge guide 23, upper belt support table 24, upper belt pivoting air source mount 25 and upper belt guide rollers 26.

When viewed from the left side of the machine the lower conveyor belt 19 is supported by the lower belt support table 22 and is driven by the lower belt drive shaft assembly 12 rotating in a counter clock wise direction. This enables product to be fed from the product infeed table onto the lower conveyor belt 19 which moves the product past the lower support table with air source 22 and onto the lower belt discharge guide 23.

When viewed from the left side of the machine the upper conveyor belt 20 is supported by the upper belt support table 24 and is driven by the upper belt drive shaft assembly 14 rotating in a clock wise direction. This enables the lower section of the upper belt 33 to travel in the same direction as the upper section of the lower belt 34.

The upper drive shaft assembly 14 is driven by the upper belt drive assembly 28 which maintains a 1 to 1 drive ratio which causes the upper conveyor belt 20 to travel and the same linear travel speed as the lower conveyor belt 19.

The linear speed of the feed conveyor belts 19, 20 is controlled by the conveyor drive speed control 18 can be used to increase or reduce the time taken to move the product past the air source.

The linear speed range of the conveyor belts 19, 20 can also be altered by changing the sprockets in the conveyor drive chain assembly 17 to achieve a lower or higher drive ratio.

As the product travels between the upper and lower conveyor belts 19, 20, the lower horizontal portion of the upper conveyor belt 33 is displaced vertically by the product. The upper belt pivoting air source mount 25, upper air supply nozzle 29 and upper air conduit 30 pivots about the upper air supply pivot rod 27 while gravity causes the distance between the upper air source and the product to remain constant.

The lower air supply nozzle 31 and lower air conduit 32 are attached to the lower belt support table 22 and do not move.

The upper belt guide rollers 26 are used to prevent the upper conveyor belt 20 from coming in contact with the pivoting end of the upper belt pivoting air source 25.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A device for feeding plant matter for removing particulate matter therefrom comprising:
    a lower porous conveyor belt with an air source that can direct air flow past the bottom of plant matter being fed over the top of said lower porous conveyor belt;
    an upper porous conveyor belt with an air source that can direct air flow past the top of said plant matter being fed beneath a bottom horizontal portion of said upper porous conveyor belt
    wherein said air source is supporting by a pivoting mount assembly that allows the end of said pivoting mount closest to said plant matter to maintain a constant distance from said plant matter.

2. The device as defined in claim 1 wherein said lower and upper porous conveyor belts are sprocket driven connected by a 1 to 1 ratio chain drive that causes both of said conveyor belts to travel at the same linear speed.

* * * * *